Aug. 31, 1954 W. S. MARX, JR 2,687,949

METHOD AND MATERIAL FOR MAKING OVERLAY MASK

Filed March 16, 1949 2 Sheets-Sheet 1

INVENTOR.
Walter S. Marx, Jr.
BY Albert G. McCaleb
Att'y

Aug. 31, 1954 W. S. MARX, JR 2,687,949

METHOD AND MATERIAL FOR MAKING OVERLAY MASK

Filed March 16, 1949 2 Sheets-Sheet 2

INVENTOR.
Walter S. Marx, Jr.
BY Albert S. McCaleb
Att'y

Patented Aug. 31, 1954 2,687,949

UNITED STATES PATENT OFFICE 2,687,949

METHOD AND MATERIAL FOR MAKING OVERLAY MASK

Walter S. Marx, Jr., Santa Barbara, Calif., assignor to Printing Arts Research Laboratories, Inc., Santa Barbara, Calif., a corporation of Delaware Application March 16, 1949, Serial No. 81,765

18 Claims. (Cl. 41—41)

This invention relates to a method and material for making overlay masks adapted to use in the production of relief-printing and lithographic plates, and more particularly to a method and material for producing such masks without manually tracing, painting or cutting operations, or the like; it being understood that such masks have use in the establishment of highlight, line and solid areas free of pattern when the copy includes tone areas.

One of the objects of my invention is to provide a method and material by which the making of overlay masks for use in producing combination line and halftone negatives or highlight halftone negatives, of the type utilized in the manufacture of relief-printing and lithographic plates, is rendered practically automatic.

As a further object, this invention has within its purview the provision of a method and material for producing overlay masks directly from art copy by chemical action.

My invention also comprehends the provision of a method and material for producing a mask either directly from art copy or through the use of an intervening matrix, which mask and/or matrix have color filter characteristics, and which are adapted to separate use in either instance or may be used conjointly.

Other objects and advantages of the invention will be apparent from the following description and the accompanying drawings in which similar characters of reference indicate similar parts throughout the several views.

In photomechanical reproduction of art copy, which includes tone areas as well as line and type areas, it has been customary to prepare negatives by one or a combination of the following four processes:

I. *Negative stripping.*—In this process two negatives were made, one halftone negative, screened throughout its entire area; and second, a line negative, unscreened throughout its entire area. These two negatives were temporarily superimposed one over the other, and a sharp blade used to cut imagewise through both in such a way as to permit the insertion of line sections and the removal of corresponding halftone sections in proper positions to make a composite negative. This method required hand work throughout, and was very time-consuming where complicated subjects were involved.

II. *Double printing.*—Two negatives were made as in the preceding instance. The line negative was painted opaque in those sections corresponding to the tone areas of the original, and then successively printed in register with the image from the halftone negative, on one metal plate.

III. *Masking method.*—The original art subject was temporarily covered with a sheet of clear plastic. Upon that plastic sheet, and in correct position over the line areas of the subject, an opaque pigment was applied to obscure all those parts to be reproduced free of screen pattern. This was called a "line mask." Another "tone mask" was then made to similarly obscure all areas to be reproduced in halftone. It was necessary to make these masks very carefully to register exactly one with the other, and each with the original subject. In photography of the so masked original, one exposure was made with the line mask in register over the subject and a halftone screen in the camera so as to record those sections to be reproduced in tone or various shades of gray; a second exposure was made with the screen removed, the line mask removed, and the tone mask in register over the subject, to record the unscreened sections (lines, type, background, and highlights) on the same negative, in register with the tone image.

IV. *Light differentiation method.*—Combination line and halftone negatives by this method which comprises the subject matter of my U. S. Letters Patent No. 2,191,939, entitled "Photoengraving" and issued February 27, 1940, were made in a manner somewhat similar to that described in III, above, except that no tone mask was required. Original subjects prepared by light differentiation process are strongly absorptive of ultraviolet light in the tone areas. Thus when such subjects were photographed through a visually opaque ultraviolet-transmitting filter, all tone areas were photographically retarded just as though a mask had been hand-made to cover those areas. However, the line mask has still to be made by hand.

As distinguished from the processes which have been briefly referred to, this invention provides for the production of both the tone and line masks automatically, so that all hand work is eliminated. Thus, through this process both line mask and tone mask are now available for the printing and lithographic processes at an enormous saving in time, and with the increased accuracy provided by mechanical means over manual means.

For the purpose of this description, I refer throughout to:

"Color" or to "Coloring Matter" as having the commonly accepted meaning as considered in the physical sciences, with the spectrum as a basis, and without the limitations imposed by physiological or visual concepts, whereby discernible spectral energy absorption characteristics and changes occurring between wavelengths of 300 and 1200 millimicrons are included in the concepts concerned with this invention.

"Tone" or "Tone Areas," as those areas of a drawing, illustration, or picture, having a value other than white, and in contradistinction to white areas containing lines or type. Or, more specifically, as those areas of a subject or of an image of that subject, which, in current general printing practice, are reproduced in halftone screen pattern.

"Line" or "Line Areas," as those areas of a drawing, illustration, or picture, having one or a series of relatively small solidly-colored configurations such as type characters, pen, pencil or other lines or points upon an area or background effectually white in value. Or, more specifically, as those areas of a subject or of an image of that subject, which, in current general printing practice, are reproduced free of halftone screen pattern.

"Mask," a transparent or translucent covering for a subject to be reproduced, or for a facsimile of that subject, such covering having some photographically opaque area, or area capable of modification to or from photographic opacity, so as to divide the image of that subject into two or more separately recordable regions.

The method of this invention comprises the transfer of a reactive material from an image-defining part of an original subject (such as a wash-drawing, commonly used as art copy in newspaper display advertising) to a masking sheet which is to be superimposed over that subject during the photographic step incident to manufacture of a printing plate. The material, thus transferred, reacts with color in the masking sheet so as to alter that color in a corresponding image-defining area, to form an outline facsimile of the original subject. Such reactive material may be imparted to a previously completed original drawing or subject by hand in an additional operation, but it is ordinarily preferable, in order to avoid such a step, to include that material in and as part of the pigment used initially to render the drawing.

A translucent layer of, for example, a triphenylmethane type dye, coated on one face of a transparent plastic sheet, is impregnated with the correct moisture content to permit chemical reduction of that dye. That layer is then placed in close contact with an original subject which bears a readily soluble reducing agent in its tone areas only. The reducing agent on the surface of that subject is partially dissolved during contact with the moistened dye layer, and immediately reduces the dye to its colorless leuco form, discharging all color from the reacted sections (tone areas) of the layer. The dye remains in its colored, unreduced, form throughout unreacted sections of the layer corresponding to the line areas of the original subject.

Thus, when a mask so made is photographed in register with the original, unhindered photography of the tone areas is permitted through the corresponding clear areas of the mask, while photography in the non-tone areas is retarded by unreduced triphenylmethane dye in the mask, particularly when the light source used for the photograph has a color which is the complement of the original dye color.

A preferred manner of locally discoloring areas of the dye layer on the mask sheet is through the use of a separate matrix sheet to transport the dye-discharge material from the original subject to the dye layer. For instance, the original subject, bearing a soluble reducing agent in its tone areas, is brought into contact with a correctly moistened layer of clear gelatin so that a sufficient quantity of reducing agent is dissolved, adsorbing upon, and/or imbibed into, that layer. The layer so treated may then be considered as a transfer matrix which is in turn brought into contact with a dye layer in such a way that the reducing agent is permitted to react with the dye as described. By this procedure the dye layer is never in contact with the original subject, thereby avoiding any risk of possible migration of dye to the subject itself.

A variation on this second procedure has also been found advantageous. After a reducing agent is dissolved, adsorbed upon, and/or imbibed into the gelatin matrix, dye is applied directly to that matrix by painting, spraying, or by imbibition of dye from another source or layer, or by other convenient means. When dye is applied to such a matrix correctly, it becomes discharged wherever a reducing agent is present. Thus, if the matrix includes a clear support sheet, and if the gelatin or agar or other carrier layer is effectually transparent, the matrix, after dyeing, will serve as a completed mask in itself.

The dye used to provide color in the mask may be a dye substance or a combination of an extremely wide variety of dye and/or non-dye substances susceptible to changes in state of color from such reactions generally known as acid-base "indication," oxidation-reduction, non-acid to acid ion change, liberation of elements, changes in valence or solvation, photochemical and metathetical reactions, etc.

As a vehicle for the color of the masking sheet of this invention, it is preferable to use a water-swellable or hydrophilic colloid, such as gelatin or agar. Other non-hydrophilic vehicles may also be used so long as the coloring matter embodied therein retains its susceptibility to change by chemical or other means. For instance, it may be advantageous to disperse color through a layer of Pyralin cellulose nitrate which gelatinizes in acetone. An acetone-soluble color-altering compound would then be incorporated in the color layer by contact, in a manner similar to the method used for the described aqueous systems.

For convenience, the layer of color and vehicle may be coated upon a support film or sheet, and stored in rolls. The masking sheet may be kept from curling by coating its back surface with a layer of material of which the reactions with respect to thermal or atmospheric changes are similar to those of the color-and-vehicle layer.

For the purpose of this invention, it is practical in some instances to impregnate areas of the original copy with color instead of color-discharge compounds, reversing the entire procedure so that the compounds in a matrix layer (or in a layer of the eventual masking sheet) are altered by contact with the original so as to produce an effective line mask or tone mask.

For instance, tone areas of the original subject may contain Brom Cresol Purple (dibromo-o-cresolsulfonphthalein, a common acid-base indicator) in its acid, yellow, condition. By the use of an intermediate matrix, a facsimile of the Brom Cresol Purple tone image is transferred to a third layer containing a soluble base with pH adjusted to convert the indicator to its blue-violet condition, whereby converted and unconverted portions of the mask are in substantially complementary colors. When that conversion is complete, the back of the translucent mask is registered with the face of the original subject, so that the combined yellow and blue colors form a deep greenish black over the tone areas of the original, so retarding subsequent photography as to permit partial or complete recording of line or background areas without affecting the tone areas. Thus, if the line or background areas are photographed while the halftone screen is not in position, and separate halftone exposures made through a yellow filter, with mask removed, a highlight halftone negative is produced.

Or Brom Cresol Purple may be used on the masking sheet only so as to utilize its two color conditions to alternately retard successive photographic exposures of line areas and tone areas.

The original subject is prepared with tone areas containing a converter for Brom Cresol Purple, such as citric acid. The acid image is transferred preferably indirectly by an intermediate matrix, to a masking sheet bearing a layer of Brom Cresol Purple in its basic, blue condition. Areas of the mask to which the acid image is transferred then convert to the yellow and substantially complementary condition of Brom Cresol Purple. The tone areas of a mask so made are yellow and the line areas including highlights and background sections remain blue.

Subsequent photography (of the superimposed mask and copy) then requires a yellow filter for the halftone exposure during which the substantially complementary "blue" line areas are retarded, and a blue filter for the line exposure, during which that blue filter retards the substantially complementary "yellow" tone areas.

Still another variation is, for example, the coating of artists' drawing paper or board with a color-discharge compound such as a salt which is substantially acid in reaction or latent acid before the drawing is made, and rendering the tone areas of the drawing with art materials containing a basic compound sufficiently alkaline to neutralize, or over-neutralize, the acidified paper surface. When such a subject, or facsimile matrix thereof, is transferred to a layer of Heptamethoxy red (2,4,6,2',4',2'',4''-heptamethoxytriphenylcarbinol or other acid-base indicator of similar behavior) in its basic, red, condition, then that layer will effectually lose its color over line and background (acidified) areas while retaining color over tone (neutralized) areas. Subsequent photography is then essentially as described in the preceding instance, except that complementary minus-red, and red-transmitting filters are used.

It will be obvious that a great number of variations are possible. The single fundamental necessity being only a clean-cut transfer of either color or color-altering compounds from the original subject to the subsequent mask, by means either direct or indirect, so that said mask aids photography of tone areas and/or line areas each independently of the other.

The many variations for using the method of this invention however, fall generally into three primary alternatives, to which further variations are either corollary or secondary. Summary is simplified by considering the tone areas of a subject or its image as one "phase" of the photomechanical function; and the line areas, similarly, as another phase. Then photographic isolation of each phase is established by using:

(1) A mask to retard photography of one phase, and the original subject itself to retard photography of the other phase;

(2) A mask to retard photography of both phases alternately; and (3) A mask to retard photography of one phase.

Alternatives (1) and (2) are useful for production of line-and-halftone combination negatives, and alternative (3) for highlight halftone negatives. Examples of each of the foregoing alternatives are provided in this description as follows.

Referring to the two sheets of drawings.

Figure 8:
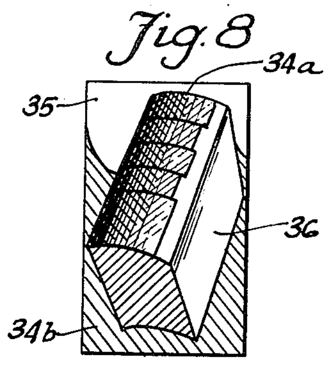
Fig. 8 is an illustration of an original art copy subject to be reproduced and which includes highlight, background and tone areas.
Figure 9:
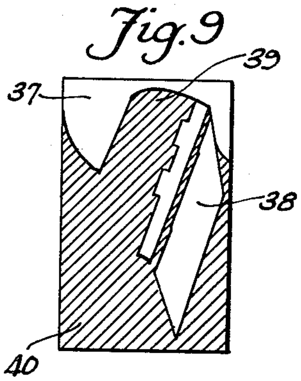
Fig. 9 is an illustration of a mask made by my preferred method from the original art copy of Fig. 8.
Figure 10:
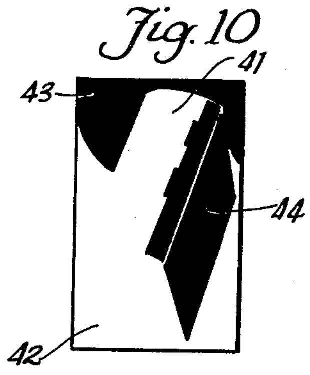
Figures 11, 12, 13, 14:
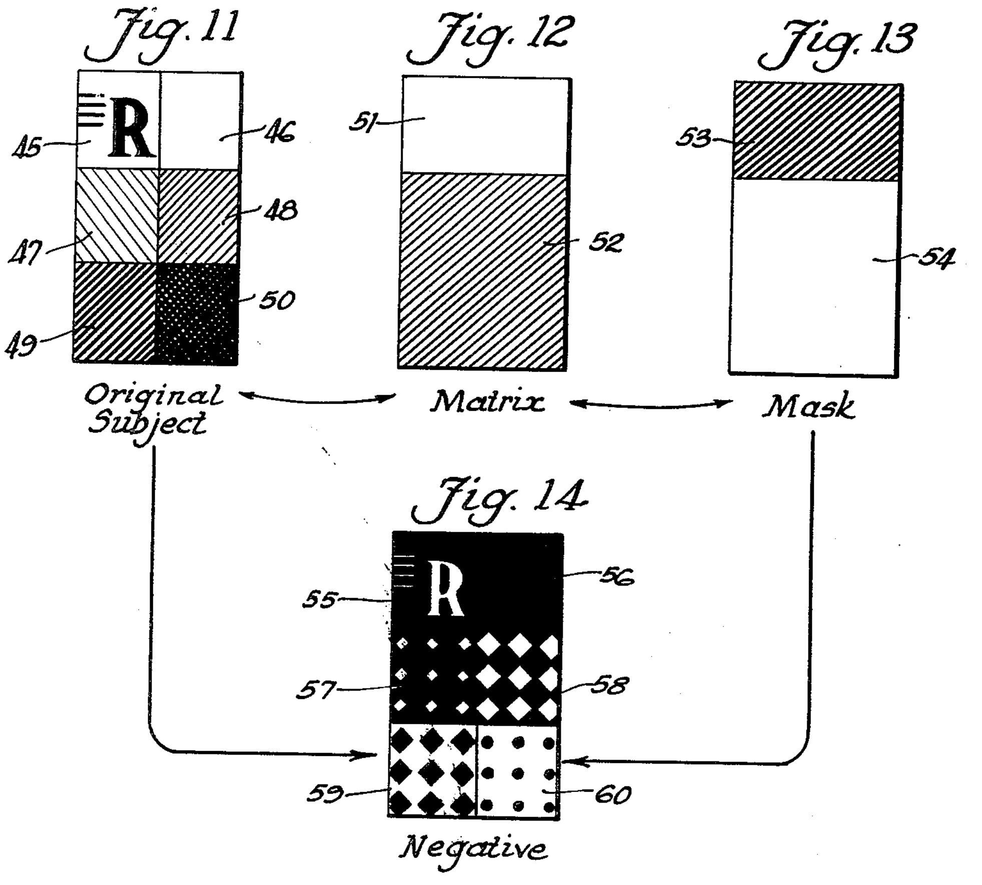

Fig. 10 is a negative reproduction made photographically from the superposed mask and art copy of Figs. 8 and 9; and Figs. 11 to 14 inclusive provide a flow chart indicating the steps of my preferred method, in which chart Fig. 11 is illustrative of an original art copy, Fig. 12 depicts a matrix and Fig. 13 illustrates a mask made from the matrix, while Fig. 14 is a negative made photographically from the superposed mask, matrix and original art copy of Figs. 13, 12 and 11 respectively.

Figures 1, 2, 3, 4, 5, 6:
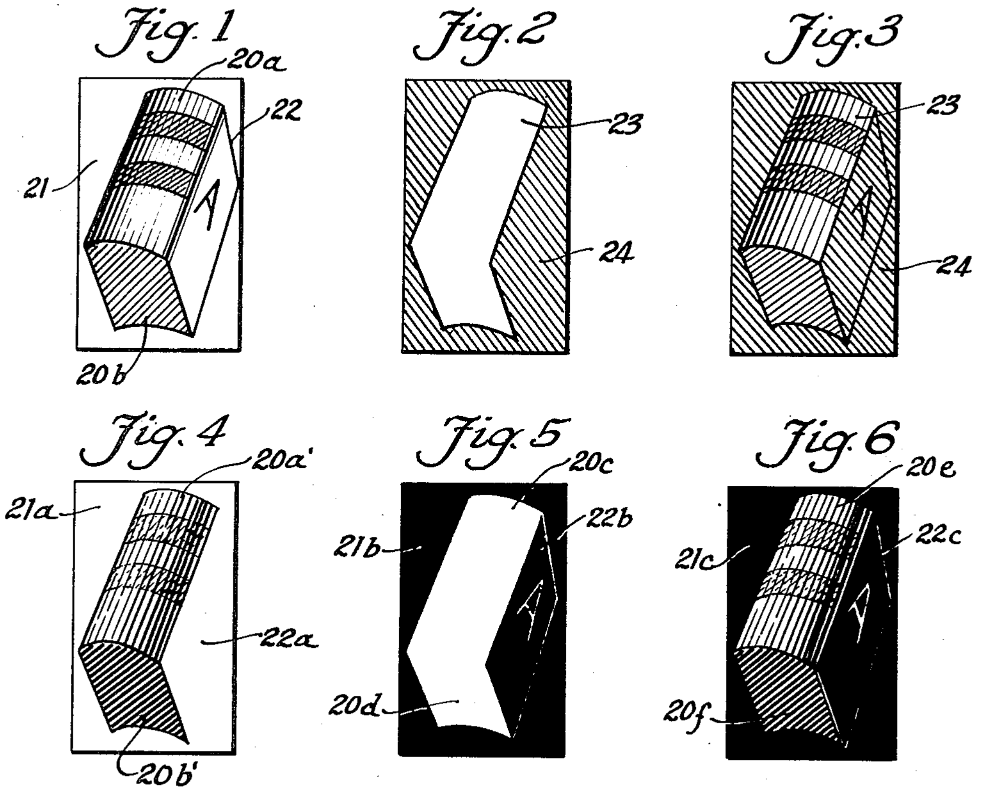
Fig. 1 is a representation of an original art copy which is to be reproduced and which includes a combination of tone, background, highlight and line areas.
Fig. 2 depicts a mask made by my preferred process from the art copy of Fig. 1.
Fig. 3 illustrates the superimposition of the mask of Fig. 2 upon the art copy of Fig. 1.
Fig. 4 is a representation of a halftone negative made photographically from the superimposed mask and art copy of Fig. 3.
Fig. 5 is an illustration of a line negative made photographically from the superimposed mask and art copy of Fig. 3.
Fig. 6 is a negative made by the superimposed combination of the negatives of Figs. 4 and 5, which negative is suitable for use in the production of halftone printing plates.

Fig. 1 is illustrative of an exemplary art copy including a line-and-halftone combination subject wherein shaded portions 20a and 20b depict tone areas, subsequently to be reproduced by halftone screen pattern. Area 21 is typical of a background section which, with my preferred method and material, is reproduced free of screen pattern. Portion 22, on the other hand, exemplifies a line-and-type area, which is also to be reproduced free of screen pattern.

In preparing the subject of Fig. 1, by one aspect of my invention, an absorbent of ultraviolet light, such as quinine bisulphate, referred to in my aforementioned Patent No. 2,191,939, is included in the wash with which the tone areas are rendered. Sodium sulfite may be added to that ultraviolet absorbing medium, a workable concentration being in the neighborhood of 1% to 2%. There is, of course, no ultraviolet absorbing compound, or sodium sulfite in the line-and-type area 22, nor in the background areas 21.

Fig. 2 represents a transparent sheet bearing on one surface a colloidal layer containing fuchsine, a red-purple triphenylmethane dye, very sensitive to sodium sulfite reduction. That fuchsine layer has been lightly moistened and put into intimate contact with the art copy subject of Fig. 1, so that some of the sodium sulfite from tone areas 20*a* and 20*b* in Fig. 1 has been transferred to the fuchsine layer on the sheet of Fig. 2. Being partially dissolved by the moisture in that layer, the sodium sulfite has reacted with the fuchsine to convert it by reduction to its colorless leuco form, thus discharging color from a reacted area 23. Unreduced fuchsine remains in its original color condition throughout the balance of the layer and comprises a colored area 24.

Fig. 3 represents the approximate appearance of the art copy subject of Fig. 1, after the locally-discharged sheet or mask of Fig. 2 is superimposed over it, in register, and shows the correct arrangement for photography.

Fig. 4 depicts a halftone negative made by photographing the masked art copy of Fig. 3, when the photograph is taken through a yellow transmitting filter which blocks out the red-purple color of the fuchsine in area 24 of Fig. 3. Area 23 of Fig. 3 being effectually transparent to the yellow filter, allows practically unhindered photography so that a proper halftone image, areas 20*a'* and 20*b'* of Fig. 4, is recorded from areas 20*a* and 20*b* of Fig. 1. The negative of Fig. 4 has not been affected in background, or line-and-type areas 21*a* and 22*a* respectively, because of the combined mask and filter action.

Fig. 5 illustrates the appearance of an unscreened (line) negative made directly from the masked art copy of Fig. 3 when photographed through a visually opaque filter which is efficiently transparent in the near ultraviolet range between wavelengths of about 360 to 400 millimicrons. The fuchsine layer, being highly transparent to the ultraviolet light used to form this image, does not effectually obstruct the photography of the masked area 24; with the result that negative areas 21*b* and 22*b* are produced along with clear areas 20*c* and 20*d* corresponding to art copy areas 20*a* and 20*b*, respectively. Since the tone areas of the art copy contain the material which is absorbent of ultraviolet light (of the same wavelength range as that freely transmitted by the filter and fuchsine layer), as described, the areas 20*c* and 20*d* receive no light which is actinic under the conditions, and consequently remain clear on the negative (Fig. 5).

Instead of making the negatives of Figs. 4 and 5 separately, they are usually combined, in actuality upon one negative element. This negative, when processed according to general halftone practice, provides a reproduction essentially as shown in Fig. 6, having halftone areas 20*e* and 20*f*, while background area 21*c*, as well as line-and-type area 22*c*, are devoid of screen pattern.

In the foregoing exemplary embodiment of the invention, it may be advantageous to transfer sodium sulfite from tone area 20*a* and 20*b* of Fig. 1 to the masking sheet of Fig. 2 through the use of a separate and intermediate matrix composed, for instance, of soft gelatin coated on any convenient support layer. That gelatin, when adequately moistened, will transfer enough sodium sulfite from the tone areas of the art copy subject to the fuchsine layer of the mask, Fig. 2, to effect the reduction shown therein. The use of such an intermediate matrix prevents any of the fuchsine in the masking sheet from inadvertently staining the original art copy.

Also, if the matrix support sheet is transparent, it may be made to imbibe fuchsine from the masking sheet of Fig. 2 in sufficient quantity so that the matrix itself may serve as a masking sheet either by itself, without the sheet of Fig. 2, or in tandem with the sheet of Fig. 2, when the two sheets are superimposed in register. Fuchsine is, of course, locally reduced imagewise in both matrix and masking sheet in the latter case.

Figure 7:
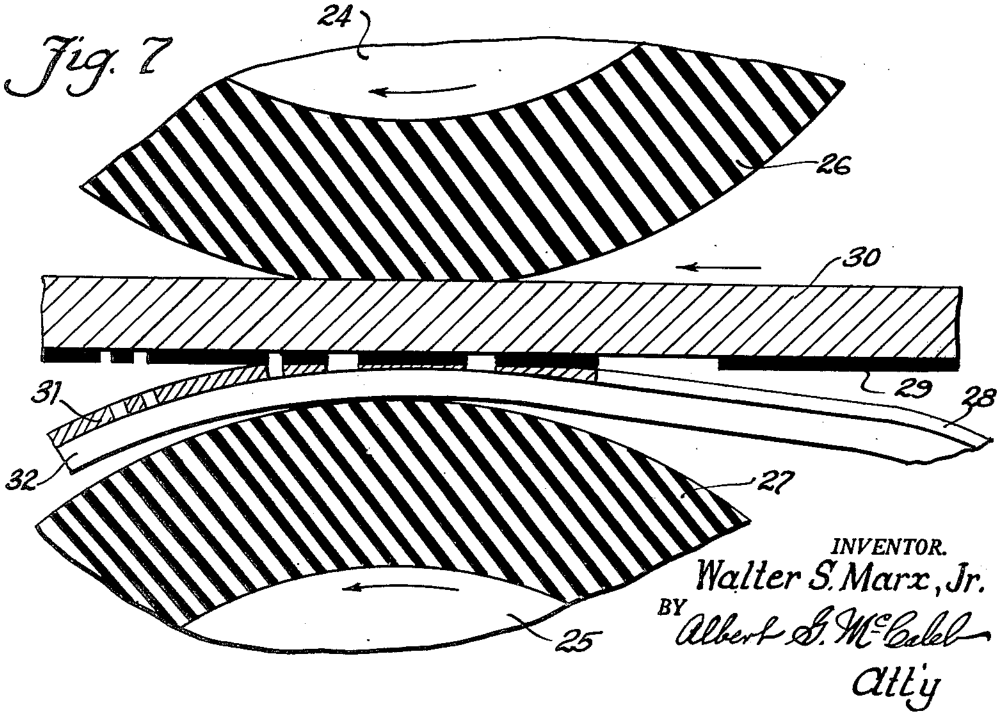
Fig. 7 is a fragmentary end elevational view depicting a preferred method and apparatus for effecting an image transfer step utilized in the disclosed method.

Irrespective of whether a single masking sheet or a supplementary matrix is used for effecting the transfer, intimate contact of either with the original subject may be accomplished by the use of apparatus, such as that fragmentarily shown in Fig. 7. Rollers 24 and 25 are covered with layers 26 and 27 respectively of soft rubber or a similar elastic material, and are preferably geared together so that the surfaces of a transfer layer 28 and original art copy subject surface 29 are passed between those rollers without slippage, and with pressure sufficient to compress the transfer layer into the surface grain and contour of paper sheet 30 on which the original art copy subject is rendered.

By this or a similar means, and to continue the example at hand, sodium sulfite is transferred from the original art copy subject surface 29 to either a matrix layer 31 of gelatin on a matrix sheet 32 or directly to the gelatin layer on the surface of the final masking sheet previously impregnated with fuchsine.

Proper moisture content in the gelatin transfer layer may be established, for instance, by immersion of the entire layer in an aqueous charging bath until the gelatin is partially or completely swollen. Surface liquid is then removed. The final water charge in the layer is controlled by characteristics of the particular grade of gelatin used in making the layer, and by the proportion of water to other liquids in the charging bath, and by the surface active (molecular) or "wetting" power of that bath relative to the particular gelatin used.

This method is also useful for the production of highlight halftones. An exemplary illustration of a highlight halftone original subject for reproduction is depicted in Fig. 8, wherein areas 34*a* and 34*b* are in various values of tone, area 35 represents a background section which, for purposes of halftone reproduction, is considered as having the same value as a highlight section, typified by area 36, and receives the same treatment by the method of this invention. The tone areas 34*a* and 34*b*, in addition to the pigments with which they are rendered, may also contain a latent basic compound which is highly water-soluble, such as sodium carbonate or dibasic sodium phosphate. By direct contact, a moistened matrix layer transfers such basic compound to a similar layer in the subsequent masking sheet which may contain an indicator dye, also water-soluble, such as p-nitrophenol. This dye is colorless in its acid condition (pH range 5.0 to 7.6) and a deep yellow in its basic condition (pH greater than 7.6). If the masking layer contains throughout p-nitrophenol in its colorless acid condition, then the transfer of soluble basic compound converts the p-nitrophenol to its yellow condition in image-defining areas. Such a masking layer is illustrated in Fig. 9, wherein areas 37 and 38 are colorless, unconverted and acidified p-nitrophenol, and areas 39 and 40 are converted basic p-nitrophenol, having a deep yellow color.

Fig. 10 represents a line negative made from a combination of the mask of Fig. 9 with the original art copy subject of Fig. 8. For making the negative of Fig. 10, the mask was, of course, superimposed in register over the original subject. The negative of Fig. 10 was also made, in this instance, while using a blue filter (complementary to the yellow) interposed between light source and negative elements, so that the yellow areas 39 and 40 of the mask (Fig. 9), being absorptive of blue light, prevented photographic action on corresponding areas 41 and 42 of the negative shown in Fig. 10. The remaining highlight and background areas reflect (blue) light, and record substantially as shown by areas 43 and 44 of Fig. 10. It may be readily understood, that if a halftone image of the art copy is photographed in register with the line image of Fig. 10, which art copy halftone image occupies areas 41 and 42, a highlight halftone negative is produced. That halftone image may be made either by removing the mask, or by leaving it in place and making the photograph while using a yellow filter interposed between the light source and the negative element.

A diagrammatic flow chart, including Figs. 11 to 14, is provided to clarify the steps comprising a preferred embodiment of this method. Fig. 11 represents art copy or the like including an area 45 comprising a line and type section, 46 a highlight or background section, 47, 48, 49 and 50 present four tone values of gray increasing from light to dark. Fig. 12 depicts an intermediate matrix made by contact with the original subject of Fig. 11, wherein area 51 (corresponding to areas 45 and 46 of Fig. 11) includes the line, type, background, and highlight sections, and has not been affected by contact with the original subject. Area 52 (corresponding to areas 47, 48, 49 and 50, of Fig. 11) bears a transfer of the color or color-altering compound in the tone sections. Fig. 13 shows the subsequent masking sheet made from the matrix of Fig. 12 and of which area 53 represents an unaltered color, and area 54 has been altered by the compound in area 52 of the matrix (Fig. 12).

Fig. 14 is a representation of a combination line-and-halftone negative made from the original subject of Fig. 11 through either the mask of Fig. 13, or the matrix of Fig. 12, or the combination of matrix and mask (Figs. 12 and 13 respectively) superimposed in register each with the other and with the original subject; the designations of the halftone pattern being somewhat exaggerated. The use of the combined matrix and mask is preferred for three reasons:

(*a*) Because on both matrix and mask surfaces, the moistened transfer layers are contained within the sandwich of matrix and mask, so as to present only dry outer surfaces to both the original subject and copyboard cover-glass under which the superimposed combination is held flat during photography. Hence, no time is lost in drying the transfer layers.

(*b*) Neither the color from the mask, nor color-altering compound from the matrix may, in this position, be inadvertently damaged, nor may those materials contaminate the original subject or the copyboard cover-glass.

(*c*) Where the color alteration has been effected through a reduction reaction, such a face to face position of mask and matrix retards possible reoxidation which may tend to reverse the color change.

In the negative of Fig. 14, as made, unscreened area 55 is a continuous unscreened photographic record of line and type area 45 in Fig. 11. Area 56 is a continuous unscreened photographic record of highlight and/or background area 46 of Fig. 11. Areas 57, 58, 59 and 60 represent, by greatly enlarged halftone screen pattern, the approximate appearance of a halftone negative made through the mask from the areas 47, 48, 49 and 50 of Fig. 11, respectively.

Although my invention has been described in connection with specific details of the embodiments thereof, it must be understood that it is not intended to be limited thereto except in so far as set forth in the accompanying claims.

Having thus described my invention, I declare that what I claim is:

1. The method of making an overlay mask on a base sheet of transparent or translucent material for use in the production of relief halftone and lithographic plates and the like from art copy having tone and other areas, which method comprises the steps of applying to the base sheet a surface exposed layer of a color-changeable substance, distinguishing between the tone and other areas of the art copy by the inclusion in one of said areas of a color-altering substance chemically reactive with said color-changeable substance in the presence of activating moisture to effect a change of the color thereof, moistening said surface layer of color-changeable substance, and placing the base sheet upon the art copy with the color-changeable substance in contact with said areas thereof.

2. The method of making an overlay mask as defined in claim 1, and wherein said color-altering substance is a reducing agent and is in the tone areas, and said color-changeable substance is convertible by the reducing agent to a different color.

3. The method of making an overlay mask as defined in claim 1, and wherein said color-altering substance is an oxidizing agent and is in the tone areas, and said color-changeable substance is convertible by the oxidizing agent to a different color.

4. The method of making an overlay mask as defined in claim 1, and wherein said color changeable substance is an acid-base indicator, and said soluble substance is one having a pH value preselected to effect a change of color of the indicator.

5. The method of making an overlay mask for art copy having tone and other areas, which mask is on a base sheet of transparent material having thereon a normally dry and exposed moisture adsorbent layer including a substance changeable in color by the chemical action of a reactive material, and comprising the steps of moistening the exposed absorbent layer, and placing said moistened layer in intimate contact with said art copy after selected areas of the art copy have been treated to include the said reactive material in an amount sufficient to effect a color change of the layer by chemical reaction.

6. The method of making an overlay mask for use in the production of relief halftone and lithographic plates from art copy having tone and other areas and by the use of a transparent base sheet having thereon a normally dry surface layer of absorbent material including a substance changeable in color by the chemical action of a reactive material together with art copy having a selected area which includes said reactive material to an extent sufficient to effect the alteration of the color-changeable substance, which method comprises the steps of conditioning the surface layer of the base sheet, and bringing the conditioned surface layer into intimate contact with said art copy without slippage between the layer and art copy.

7. The method of making an overlay mask as defined in claim 6, and wherein the bringing of the conditioned surface layer into intimate surface contact with the art copy is effected by passing the base sheet and art copy between adjacent rollers in such relationship as to utilize the roller pressure to effect the desired pressure between the conditioned surface and art copy, while separating the surfaces thereof on opposite sides of the rollers.

8. The method of making an overlay mask for use in the production of relief halftone and lithographic plates from art copy having tone and other areas and by the use of a transparent or translucent base sheet having thereon a normally dry surface layer of absorbent material including a substance changeable in color by the chemical action of a reactive material together with art copy having a selected area which includes said reactive material to an extent sufficient to effect the alteration of the color-changeable substance, which method comprises the steps of conditioning the surface of a matrix sheet having an absorbent surface, bringing the conditioned surface of the matrix into intimate contact with the art copy so that it will gather reactive material from said selected areas thereof, and then bring the conditioned surface of the matrix into intimate contact with said surface layer of the base sheet.

9. The method of making an overlay mask from art copy which embodies tone and other types of areas and which areas are distinguished by including in a selected type thereof a material soluble in a wetting agent and chemically reactive with a color-changeable substance to effect a change of the color thereof, which method comprises the steps of applying to the surface of the art copy a matrix sheet having the copy contacting surface thereof moistened with the wetting agent, maintaining the matrix sheet in contact with the art copy for a time sufficient for an effective quantity of the chemically reactive material to be transferred thereto, removing the matrix from the art copy, and then applying the moistened surface of the matrix to the surface of a transparent base sheet having thereon an absorbent material including said color-changeable substance.

10. The method of making an overlay mask from art copy which embodies tone and other types of areas and which areas are visibly or invisibly distinguished by including in a selected type thereof a material soluble in a wetting agent and chemically reactive with a color-changeable substance to effect a change of the color thereof, which method comprises the steps of moistening with said wetting agent the surface of a translucent base sheet which has thereon an absorbent layer including said color-changeable substance, and applying said moistened surface to the art copy.

11. The method of making an overlay mask for use in the production of relief printing and lithographic plates and by using an art copy sheet having tone and other areas, a gelatin-coated matrix sheet, and a transparent base sheet, preselected areas of the art copy and one surface of the base sheet having thereon chemically reactive substances, one of which substances is changeable in color upon chemical reaction with the other, said method comprising the steps of placing the gelatin-coated matrix in intimate surface contact with the areas of the art copy sheet, removing the matrix from the art copy sheet, and then placing the matrix sheet in intimate surface contact with said one surface of the base sheet so as to effect a transfer by the matrix sheet of the substance from the selected areas to the one surface of the base sheet.

12. As an article of manufacture, a matrix for the practically automatic production of an overlay mask from suitably prepared art copy having defined tone and non-tone areas, one of which includes a chemically effective reactor substance, which mask is for use in making relief printing and lithographic plates and the like, said matrix comprising a supporting sheet of effectually transparent material, a coating on one surface of the sheet of a normally translucent substance which is normally absorptive of a substantial quantity of moisture and in which is dispersed a relatively light-stable monochromatic color-changeable material productive of a substantially unshaded high contrast color change within said coating and such that the light absorption characteristics of the color-changed portions of said material differ distinctly from those of the unchanged material as the result of chemical reaction with the chemically effective reactor substance in the art copy, so as to effect sharply defined high contrast color discrimination in the coated surface which corresponds to the defined areas of the art copy.

13. A matrix for the practically automatic production of an overlay mask as defined in claim 12, and wherein the normal color of said color-changeable material and the color of the color-changed portions of said material are color complements of one another.

14. A matrix for the practically automatic production of an overlay mask as defined in claim 13, and wherein the color-changeable material is Brom Cresol Purple.

15. As an article of manufacture, a matrix for the practically automatic production of an overlay mask for use with a light source of predetermined color and from suitably prepared art copy having defined tone and non-tone areas, one of which includes a chemically effective reactor substance, said matrix comprising a supporting sheet of effectually transparent material, a coating on one surface of the sheet of a normally translucent substance which is normally absorptive of moisture and in which is dispersed a relatively light-stable monochromatic color-changeable material productive of a substantially unshaded high contrast color change between colored and colorless states as the result of chemical reaction within said coating with said chemically effective reactor substance in the art copy, the color of said color-changeable material in the colored state thereof being the color complement of said predetermined color, thereby to effect sharply defined high contrast color discrimination in the mask which corresponds to defined areas of the art copy and which, in the colored areas, will deter photography of art copy through the mask when a photographic light source of said predetermined color is used.

16. A matrix for the practically automatic production of an overlay mask as defined in claim 15, and wherein the color-changeable material is an acid-base indicator.

17. A matrix for the practically automatic production of an overlay mask as defined in claim 15, and wherein the color-changeable material is fuchsine.

18. A matrix for the practically automatic production of an overlay mask as defined in claim 15, and wherein the color-changeable material is p-nitrophenol.

References Cited in the file of this patent

UNITED STATES PATENTS

| Number | Name | Date |
|---|---|---|
| 1,592,162 | Smith | July 13, 1926 |
| 1,614,924 | Hutchinson | Jan. 18, 1927 |
| 2,040,170 | Eader | May 12, 1936 |
| 2,289,714 | Land | July 14, 1942 |
| 2,360,587 | Sanders | Oct. 17, 1944 |
| 2,596,754 | Yackel | May 13, 1952 |